METHOD AND APPARATUS FOR DETECTING TRACER GAS

Original Filed Aug. 13, 1970

INVENTORS
ANTHONY JENKINS
RICHARD C. CORNELL
BY
Woodhams, Blanchard & Flynn
ATTORNEYS United States Patent Re. 28,417
Reissued May 6, 1975

28,417

METHOD AND APPARATUS FOR DETECTING TRACER GAS

Anthony Jenkins and Richard C. Cornell, Royston, England, assignors to Analytical Instruments, Ltd., Royston, England Original No. 3,699,342, dated Oct. 17, 1972, Ser. No. 63,571, Aug. 13, 1970. Application for reissue May 21, 1973, Ser. No. 362,432
Claims priority, application Great Britain, Apr. 27, 1970, 20,180/70
Int. Cl. G01c *1/18*
U.S. Cl. 250—302 5 Claims

Matter enclosed in heavy brackets [ ] appears in the original patent but forms no part of this reissue specification; matter printed in italics indicates the additions made by reissue.

ABSTRACT OF THE DISCLOSURE

A method and apparatus for detecting the presence of an halogenated tracer gas, which is an electron absorber, in an environment which is itself, or comprises as a constituent, an electron absorber. The apparatus comprises an electron capture detector and the environment to be sampled is first drawn through a membrane which has a greater permeability to the tracer gas than the remainder of the environment before being carried into the detector by a carrier gas. This results in a diminution of the concentration of any electron capture agents present in the environment and which if drawn into the detector could swamp the effect of the tracer gas.

Figure 1:
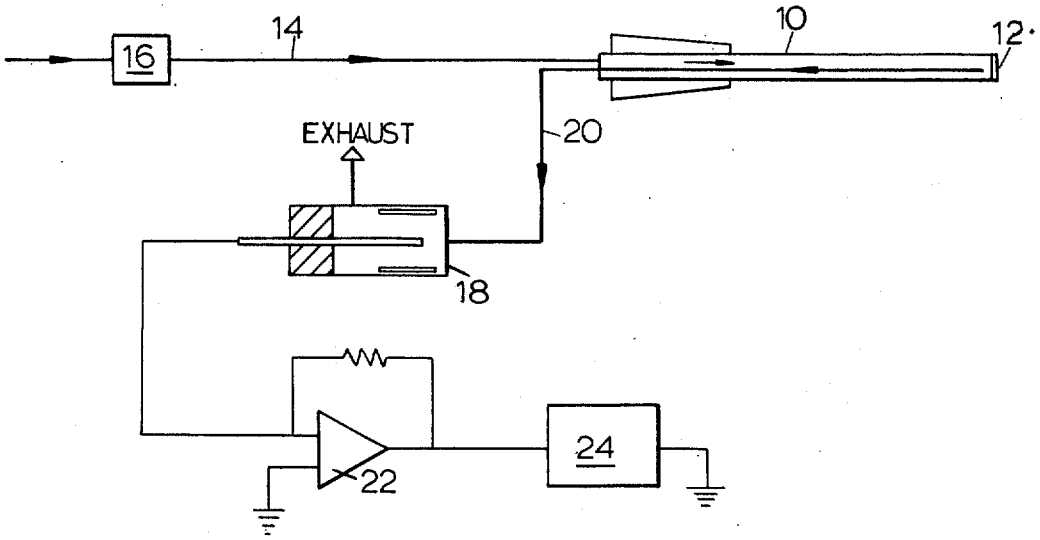

The present invention relates to a method and apparatus for detecting the presence of electron capture tracer gases. As examples of such gases there can be mentioned $SF_6$, $C_2H_2Cl_2$, $C_2H_2Br_4$, $C_2H_2Cl_4$, $CCl_2F_2$ and $CBrClF_2$. Such tracer gases are electron absorbers and the apparatus is particularly concerned with the detection of such tracer gases present in an environment which is itself, or comprises as a constituent, an electron absorber.

One use for tracer gases is the detection of leaks in a gas system. In two known methods the tracer gas has been helium, which is detectable by a mass spectrometer and freon which is detectable by a halogen detector. The mass spectrometer is both bulky and expensive. The halogen detectors are not sufficiently sensitive for a number of applications.

The present invention utilizes an electron capture detector for detecting the presence of the tracer gas. An electron capture detector generally comprises an ionization chamber containing a $\beta$ particle emitter, such as tritium, as the primary source of ionizing radiation. Upon entry into the chamber of a carrier gas such as nitrogen possessing no affinity for electrons, recombination of positive ions nad free electrons formed by the ionizing radiation is unlikely to take place because of the free electrons high mobility. Thus by applying a small potential across the chamber all ions formed by the ionizing radiation can be collected. When the carrier gas contains a compound having an affinity for electrons, negative ion formation occurs which is accompanied by an observed decrease in current.

The present invention seeks to provide a method and apparatus which can be used to monitor atmospheric air or other gas samples for the presence and concentration of sulphur hexafluoride and other halogenated tracer gases. Oxygen itself is capable of electron capture and it could therefore saturate the detector.

According to one aspect of the present invention a method of detecting and monitoring the presence of halogenated tracer gas in a gas supply having as a major constituent thereof an electron capture material comprises selectively isolating said tracer gas from the remainder of the supply by diffusion through a membrane having a greater permeability to said tracer gas than to the remainder of the supply, and thereafter conveying the tracer gas into an electron capture detector by means of a gas stream substantially inert to electron capture.

According to another aspect of the present invention, an apparatus for detecting and monitoring the presence of halogenated tracer gas supply comprises a probe carrying a membrane having a greater permeability to said halogenated tracer gas or gases than the remainder of the gas supply, means for conveying a carrier gas to the side of the membrane remote from the gas supply and an electron capture detector to receive said carrier gas containing the halogenated tracer gas whereby to detect the latter.

When the halogenated tracer gas is present in the atmosphere it is necessary to separate the tracer gas from the oxygen of the atmosphere prior to introduction into the detector. Oxygen is itself an electron absorber and its presence would saturate the detector and effectively blanket the presence of the tracer gas. Sufficient amount of the tracer gas must be introduced into the detector to obtain a useful response of the detector and it is therefore necessary to separate the tracer gas from the atmospheric oxygen prior to its introduction into the detector.

This is achieved by separating the detector from the atmosphere or other gas supply containing a preponderance of an electron capture material in addition to the electron capture tracer gas by means of a membrane. The tracer gas can pass through the membrane and is then swept into the detector by a stream of inert gas i.e. inert to electron capture. A suitable carrier gas is nitrogen.

A suitable membrane is formed from a silastomer.

Figure 2:
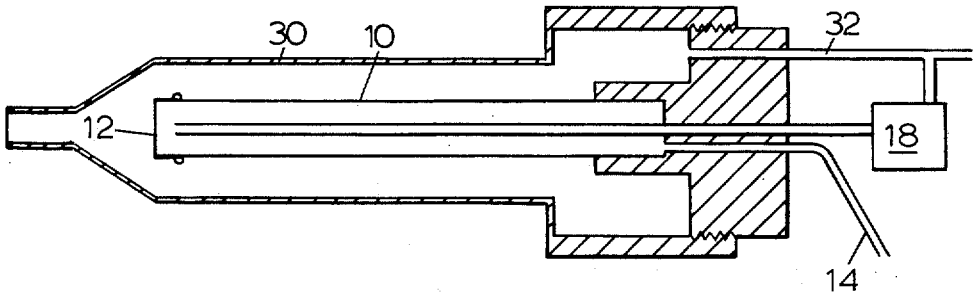

The invention will be described further by way of example with reference to the accompanying drawings in which:

FIG. 1 is a diagrammatic representation of an apparatus according to the invention, and FIG. 2 shows a modification of part of the apparatus in which a sampling probe is contained in an outer sheath.

A sampling probe 10 for introducing a gas to be analyzed into an electron capture detector is closed at one end by a membrane 12. The membrane is preferably formed from a silastomer as this has a permeability to some halogenated tracer gases which is of the order of ten times greater than that to oxygen. The opposite end of the probe is connected through a line 14 controlled by a valve 16 to a nitrogen supply, the nitrogen serving as a carrier gas to convey the gas to be analyzed into the electron capture detector 18 by way of a line 20. The line 20 commences adjacent the membrane 12. An amplifier 22 and a meter 24 are connected to the detector. When the gas to be analyzed contains tracer gas and is introduced into the detector this results in a change in the ionization current which charge is indicative of the concentration of tracer gas in the nitrogen carrier gas stream and is noted on the meter 24.

The term silastomer refers to a thin film or sheet of silicone rubber.

In FIG. 2, the sampling probe 10 is contained within an outer sheath 30. The end of the sheath 30 adjacent the membrane 12 is open to the atmosphere while the other end of the sheath commnuicates through line 32 with a suction means, for example an air pump (not shown). The pump draws air or gas to be sampled into the sheath and into contact with the membrane Furthermore, as shown in FIG. 2, the exhaust from the detector 18 can be connected to the suction line 32. This provides a convenient method of determining flow from the detector. The draft created by the suction makes the probe less directionally sensitive and it can pick up a tracer gas at greater distances from a leak than the apparatus of FIG. 1.

The apparatus can be used for detecting leaks in a gas system having a halogenated tracer gas. Examples of tracer agents are sulphur hexafluoride $SF_6$ and Freon (registered trademark) such as dichlorodifluoromethane $CCl_2F_2$ and bromochlorodifluoromethane $CBrClF_2$. One particular use of the apparatus lies in the detection of leaks in containers such as aerosols. On account of its high sensitivity the apparatus can detect the presence of a very small leak and can be used to monitor such containers prior to their dispatch to consumers. The apparatus is compact and readily transportable.

The apparatus is also sensitive to the presence of nitro-compounds, such as nitroglycerine. Thus it is envisaged that the apparatus can find use as a detector for explosives.

We claim:

1. A method of detecting and monitoring the presence of an electron capture halogenated tracer gas in a gas supply having as a constituent thereof an electron capture material, comprising the steps of selectively isolating said halogenated tracer gas from the remainder of the supply by diffusion through a membrane formed from a silastomer having a greater permeability to said halogenated tracer gas than to the remainder of the supply, and thereafter conveying the tracer gas into an electron capture detector by means of a gas stream substantially inert to electron capture.

2. An appparatus for detecting and monitoring the presence of an electron capture halogenated tracer gas in a gas supply which is itself, or includes as a constituent, an electron capture material, the apparatus comprising a probe, a membrane at an end of said probe in which the membrane comprises a silastomer having a greater permeability to the halogenated tracer gas than the remainder of the gas supply, means for conveying a carrier gas to the side of the membrane remote from the gas supply and an electron capture detector to receive the carrier gas and tracer gas.

3. An apparatus according to claim 2, including an outer sheath surrounding the probe and open to the atmosphere at one end, suction means being connected to the other end of the sheath whereby to draw in a sample into the vicinity of the membrane.

*4. A method of detecting and monitoring the presence of an electron capture nitro-compound tracer gas in a gas supply having as a constituent thereof an electron capture material, comprising the steps of selectively isolating said nitro-compound tracer gas from the remainder of the supply by diffusion through a membrane formed from a silastomer having a greater permeability to said tracer gas than to the remainder of the supply, and thereafter conveying the tracer gas into an electron capture detector by means of a gas stream substantially inert to electron capture.*

*5. An apparatus for detecting and monitoring the presence of an electron capture nitro-compound tracer gas in a gas supply which is itself, or includes as a constituent, an electron capture material, the apparatus comprising a probe, a membrane at an end of said probe in which the membrane comprises a silastomer having a greater permeability to the nitro-compound tracer gas than the remainder of the gas supply, means for conveying a carrier gas to the side of the membrane remote from the gas supply and an electron capture detector to receive the carrier gas and tracer gas.*

References Cited

The following references, cited by the Examiner, are of record in the patented file of this patent or the original patent.

UNITED STATES PATENTS

| | | | |
|---|---|---|---|
| 3,361,908 | 1/1968 | Petitjean et al. | 250—381 X |
| 3,545,931 | 12/1970 | McKinley, Jr. | 55—16 |

ARCHIE R. BORCHELT, Primary Examiner

U.S. Cl. X.R.

250, 389